United States Patent [19]
Keith

[11] Patent Number: 5,363,467
[45] Date of Patent: Nov. 8, 1994

[54] COMPACT FIBER OPTIC HOUSING

[75] Inventor: Roger H. Keith, Austin, Tex.

[73] Assignee: Minnesota Mining and Manufacturing Company, St. Paul, Minn.

[21] Appl. No.: 69,177

[22] Filed: May 28, 1993

[51] Int. Cl.⁵ ............................................. G02B 6/36
[52] U.S. Cl. ................................................. 385/135
[58] Field of Search ........................ 385/134–137, 385/53, 76; 174/117 R, 17 R, 501, 54, 58, 65 R, 68.1

[56] References Cited

U.S. PATENT DOCUMENTS

| | | | |
|---|---|---|---|
| 4,319,951 | 3/1982 | Korbelak et al. | 156/502 |
| 4,359,262 | 11/1982 | Dolan | 350/96.20 |
| 4,373,776 | 2/1983 | Purdy | 350/96.20 |
| 4,500,166 | 2/1985 | Kunze | 350/96.20 |
| 4,502,754 | 3/1985 | Kawa | 350/96.20 |
| 4,595,255 | 6/1986 | Bhatt et al. | 350/96.20 |
| 4,679,896 | 7/1987 | Krafeik et al. | 350/96.20 |
| 4,685,764 | 8/1987 | Hoffer et al. | 350/96.20 |
| 4,687,289 | 8/1987 | DeSanti | 350/96.20 |
| 4,792,203 | 12/1988 | Nelson et al. | 350/96.20 |
| 4,824,196 | 4/1989 | Bylander | 350/96.20 |
| 4,900,123 | 2/1990 | Barlow et al. | 350/96.20 |
| 4,911,521 | 3/1990 | Ryuto et al. | 350/96.20 |
| 5,013,121 | 5/1991 | Anton et al. | 350/96.20 |
| 5,067,784 | 11/1991 | Debortoli et al. | 385/53 |
| 5,071,211 | 12/1991 | Debortoli et al. | 385/76 |
| 5,093,887 | 3/1992 | Witte | 385/135 |
| 5,167,001 | 11/1992 | Debortoli et al. | 385/135 |
| 5,231,687 | 7/1993 | Handley | 385/135 |
| 5,265,187 | 11/1993 | Morin et al. | 385/135 |

FOREIGN PATENT DOCUMENTS

| | | | |
|---|---|---|---|
| 149250 | 7/1984 | European Pat. Off. | G02B 6/44 |
| 331402 | 9/1989 | European Pat. Off. | G02B 6/40 |
| 58-215611 | 12/1983 | Japan | G02B 7/26 |
| 61-47906 | 3/1986 | Japan | G02B 6/00 |
| 89/05989 | 6/1989 | WIPO | G02B 6/44 |
| 90/05318 | 5/1990 | WIPO | G02B 6/38 |

OTHER PUBLICATIONS

AT&T Brochure, 636-299-012, Issue 1, Aug. 1986–"LGX (Lightguide Cross–Connect) Frame Description and Installation".

Primary Examiner—Rodney B. Bovernick
Assistant Examiner—John Ngo
Attorney, Agent, or Firm—Gary L. Griswold; Walter N. Kirn; Jack V. Musgrove

[57] ABSTRACT

A compact fiber optic housing has a tray divided into front and rear areas by a partition, the rear area receiving excess slack from optical fibers, and the front area having a bulkhead for receiving fiber optic connectors. The front and rear areas overlap to optimize the space within the tray; the tray may consist of a single base supporting the front and rear areas, or of two separate front and rear shelves which are removably attached to each other. The bulkhead includes clips which releasably secure the connectors to the tray, the clips being received in apertures in the base of the tray. A lower tier of the partition slightly overlies the apertures. Each clip is formed from a single piece of sheet metal, having a base for insertion into the apertures, and having a bulkhead riser extending perpendicularly from the base, the riser having a hole for receiving the connector coupling. The base of each clip has two tines extending under the lower tier of the partition, defining a slot which may be used for removing the clip.

18 Claims, 8 Drawing Sheets

COMPACT FIBER OPTIC HOUSING

BACKGROUND OF THE INVENTION

1. Field of the Invention

The present invention generally relates to a housing for the distribution of cables, and more particularly to a compact fiber distribution unit which stores excess fiber slack and receives a plurality of fiber optic connectors.

2. Description of the Prior Art

In recent years, fiber optic cables have replaced traditional copper wire as the preferred medium for telecommunications. As with copper wires, it is often necessary to provide cross-connections and interconnections between optical fibers at various locations in the distribution system. The prior art is replete with fiber optic organizers, junction boxes, etc, for this purpose. Several of these inventions utilize fiber organizing trays which slide out of a housing or cabinet-like drawers. In some units, the trays are pivotally attached to the housing. See, e.g., U.S. Pat. Nos. 4,792,203, 4,900,123, 4,911,521, 5,013,121 and 5,093,887.

Common features of a conventional fiber organizing tray include: a spool or reel for storing excess fiber slack and maintaining a minimum bend radius in the fibers to prevent undue stress or kinks; tabs or lugs which keep the fibers from slipping off the reel or out of the tray; a splice area having retaining clips, adhesive, or other means for attaching splice elements to the tray; and a cover for protecting selected portions of the fibers. The cabinets used with these trays sometimes have a movable shelf providing a work surface for, e.g., making the splice connections, and may include a special panel cover or other means for preventing access to certain portions of the cabinet.

It is desirable to maintain the minimum bend radius in all of the stored fibers to avoid microbends which would induce optical losses in the fibers or promote fractures. While the reels of prior art fiber organizing trays provide such a minimum radius for excess fiber slack, many of these tray designs overlook bending of the fiber at other locations. For example, several tray designs include a partition or bulkhead for receiving a plurality of fiber optic connectors. In these designs, the bulkheads are mounted relatively close to a side or front wall of the tray, and the portions of the fibers immediately adjacent the connectors often undergo bending beyond the minimum radius. See, e.g., U.S. Pat. Nos. 4,824,196 (see FIG. 3) and 5,071,211 (see FIG. 23). Although fiber bends must be gentle, this is opposed by requirements to keep fiber optic trays small. Telephone central office racks typically support a 12" maximum component depth, leaving little room for slack storage space in the rear plus room for connectors and couplings in the front area.

This effect is also illustrated in U.S. Pat. No. 4,824,196, which may be the closest prior art. That prior art fiber tray is shown in FIG. 1. Tray 1 generally comprises a base 2 having attached thereto several sheets 3 for separating the slack from several fibers, and a cover 4 hinged to base 1. Cover 4 has several clips 5 for retaining fiber slack. The front wall of base 1 comprises a bulkhead or mounting panel 6 which receives fiber optic connectors 7 of differing formats. A front cover or door 8 is pivotally attached to base 1 adjacent panel 6, door 8 having a front wall 9. As seen in FIG. 1, when door 8 is in its closed, storage position, the portion of fiber 10 leading away from panel 8 undergoes undue bending caused by the proximity of wall 9 to panel 6. In the prior art design of FIG. 1, this effect is somewhat mitigated by the oblique alignment of the connectors 7 with respect to wall 9. Bending of the fibers may also be minimized by extending wall 9 out further from panel 6, but extending wall 9 would be lead to a larger overall tray size, contrary to the highly desired trait of compactness in a fiber distribution unit (FDU). Conversely, panel 6 could be moved further into tray 1, i.e., away from panel 6, without increasing the overall size of the tray, but this would lead to undue bending of the pigtail portion 11 of the fiber against the inner partition 12, which is required to separate the slack storage area (sheets 3) from the connector area (panel 6). These prior art designs consequently have not succeeded in optimizing the spacing of the components and the slack storage areas to the satisfaction of the telecommunications companies which employ them.

Another problem in these types of FDU's relates to the interchangeability of the connector formats used on panel 6. There are several conventional connector formats (variously known as ST, SC, FC, biconic, etc.) all of which are potentially usable in an FDU. Each of these formats, however, typically requires a different style of hole or coupling in the bulkhead for attachment of the connector. Most of these are tedious or difficult to mount in the field, and allow only limited access for individual attention or replacement after being placed in service. Accordingly, FDU's have been designed which provide clips for retaining the connectors, the clips being removably attached in an identical fashion to the FDU front panel or bulkhead regardless of the style of coupling accommodated. Several such prior art designs are illustrated in FIGS. 2A–2C. Each of these designs has significant drawbacks.

In FIG. 2A, the connector clips 13 include integrally molded arrow tines 14 which latch within a tunnel or hood 15 formed in the base 16 of the tray. Clip 13 is very easy to attach, but difficult to remove since it requires two hands performing the separate, but coordinated, actions of pinching the ends of tines 14 toward one another while clip 13 is pulled away from base 16. Access to tines 14 is further impeded by the alignment of the connector 18 with tines 14, i.e., the rearwardly extending portion of connector 18 usually overlies tines 14. Therefore, it is usually necessary to either first remove connector 18, or access tines 14 from underneath base 16.

The connector clip 17 of FIG. 2B employs another simple latching element 18 which catches against a lug 19 formed along the inside wall of a face plate 20. A boss 21 on the underside of clip 17 also catches on another lug. As with the device of FIG. 2A, clip 17 is also easy to install but more difficult to remove. Removal generally requires two hands, one to push down on latching element 18 while the other pushes against the front face of the clip. If two of these clips are stacked in a duplex construction, or two couplings are mounted into a bulkhead permanently affixed to the tray, it is also nearly impossible to access the lower clip unless the upper clip or coupling is first removed.

FIG. 3 depicts another connector clip 22 having flanges 23 which are inserted under a bar 24 formed in the bulkhead or base 25 of the tray, and a latch 26 in the form of a flexural spring which extends through a hole 27 formed in base 25. This design, too, requires the use of two hands to remove, when a connector is installed on the back side of clip 22, since the connector blocks access to latch 26. This requires that one hand release latch 26 from the underside of base 25 while the other hand pulls clip 22 away from the base. Finally, even though latch 26 imparts a spring bias, this design (as well as those of FIGS. 2A and 2B) still does not provide sufficient gripping of the connector clips to the base, resulting in rattling of the clips when jostled. This is undesirable since fiber lines and devices should be protected from motion and mechanical shock whenever possible. It would, therefore, be desirable to devise a connector clip for a fiber organizing tray which is easily installed and removed, without necessitating the prior removal of any connectors attached thereto. This would facilitate access to couplings and connectors stacked in duplex arrangements, and eliminate the problems of field mounting couplings in a bulkhead or separate adapter. The clips would advantageously be attached to the tray in such a manner that they would fit snugly. It would further be desirable and advantageous to provide a construction for a fiber organizing tray which optimizes the spacing of the components and the slack storage areas to enable the tray to maintain a minimum radius for all portions of the fibers, without increasing the overall size of the tray.

SUMMARY OF THE INVENTION

The present invention provides a compact fiber optic housing generally comprising a tray or drawer having a base, means defining a first area in the base for receiving slack from a first plurality of fibers, and means defining a second area in the base for receiving portions of a second plurality of fibers, the second plurality of fibers terminating in connectors which are mounted to a connector bulkhead or bulkhead clips located in the second area, said first and second areas overlapping and being defined by partition means. In one embodiment, the first and second areas share an integral, planar base, and a balcony or shelf attached to the base serves as the partition to define and separate the two areas. In an alternative embodiment, two separate shelves having complementary surfaces are detachable connected to each other to form the tray, each shelf defining one of the two areas.

The invention further contemplates the use of novel connector clips to removably attach various types of connectors to the tray. The connector clips have a base or foot and a face plate or bulkhead riser which extends generally perpendicular to the foot. The foot is generally planar, but has a slight bow to allow a snug friction fit when placed within an aperture of the bulkhead. The foot preferably terminates in two tines or toes which extend under a lip overlying the aperture in the bulkhead. The aforementioned bow can be most easily obtained by providing a flat foot and allowing the toes to bend downward at a slight angle (opposite the direction that the riser extends). When the clip is fully inserted in the aperture, the separation between the toes defines a slot in which a screwdriver or other implement may be inserted to forcibly remove the clip from the aperture. The clip is preferably stamped from a single piece of galvanized sheet metal, and the toes are beveled in the stamping process to facilitate insertion under the lip of the aperture. The holes in the riser of the clip also preferably have an axis which forms an oblique angle with respect to the direction of insertion of the clip into the aperture. This off-axis alignment of the connectors further simplifies removal of the clip by moving the connector bodies slightly to the side, increasing access to the slot defined by the toes.

BRIEF DESCRIPTION OF THE DRAWINGS

The novel features and scope of the invention are set forth in the appended claims. The invention itself, however, will best be understood by reference to the accompanying drawings, wherein:

DESCRIPTION OF THE PREFERRED EMBODIMENT

Figure 1:
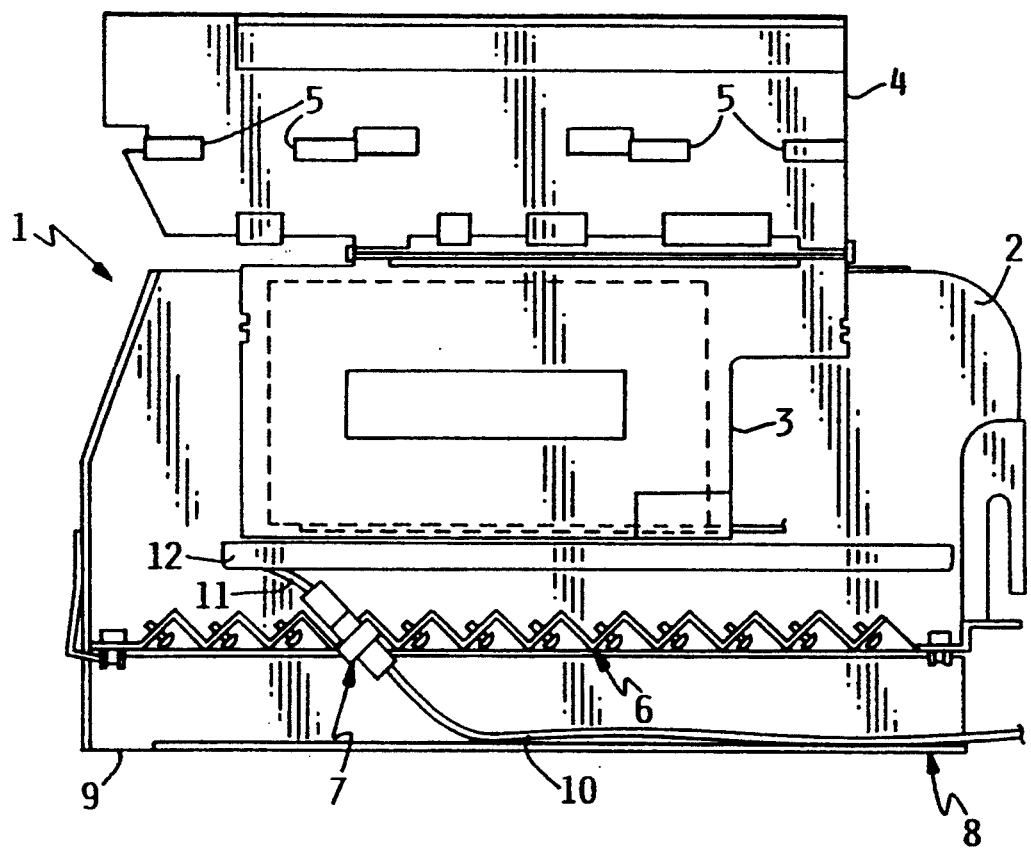
FIG. 1 is a top plan view of a prior art fiber organizing tray having a fiber storage area and a connector bulkhead.
Figure 2A:
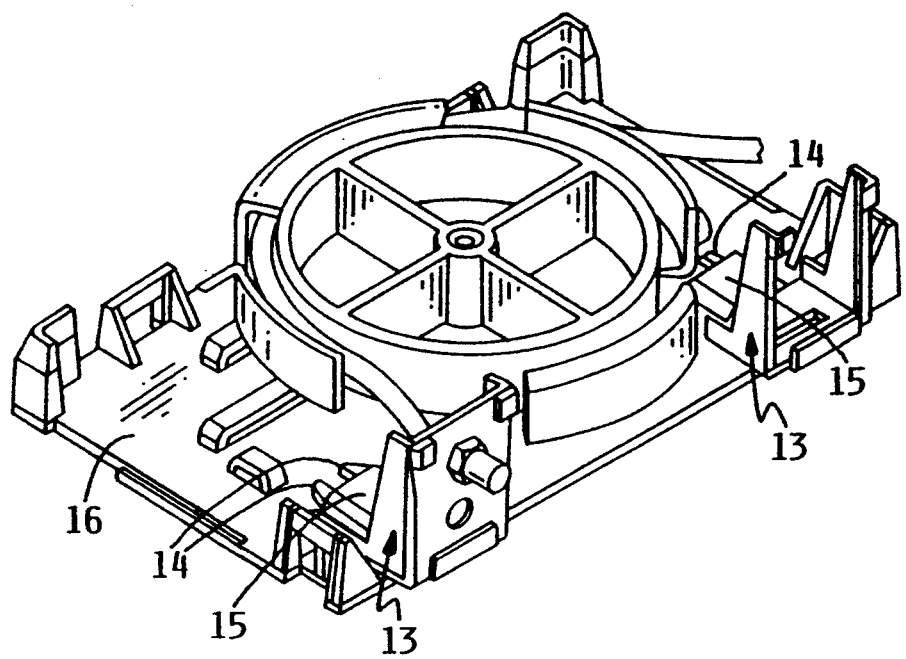
FIGS. 2A–2C are views of prior art clips used to attach fiber optic connectors to a fiber storage tray or distribution unit.
Figure 2B:
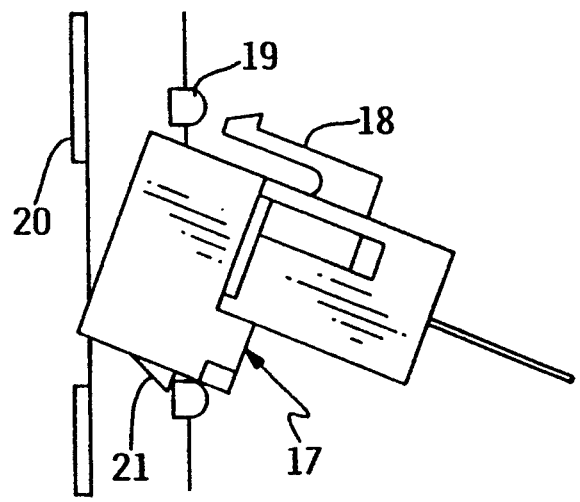
Figure 2C:
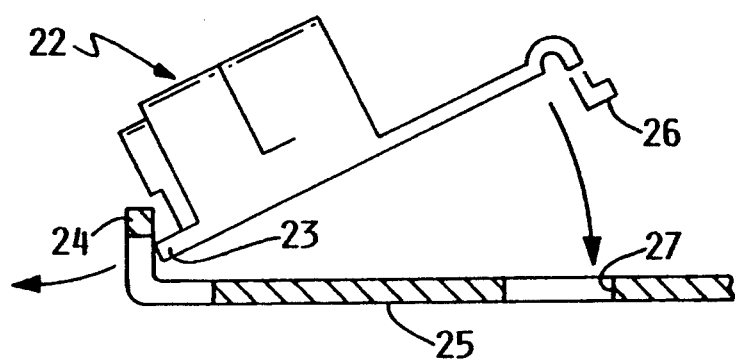
Figure 3:
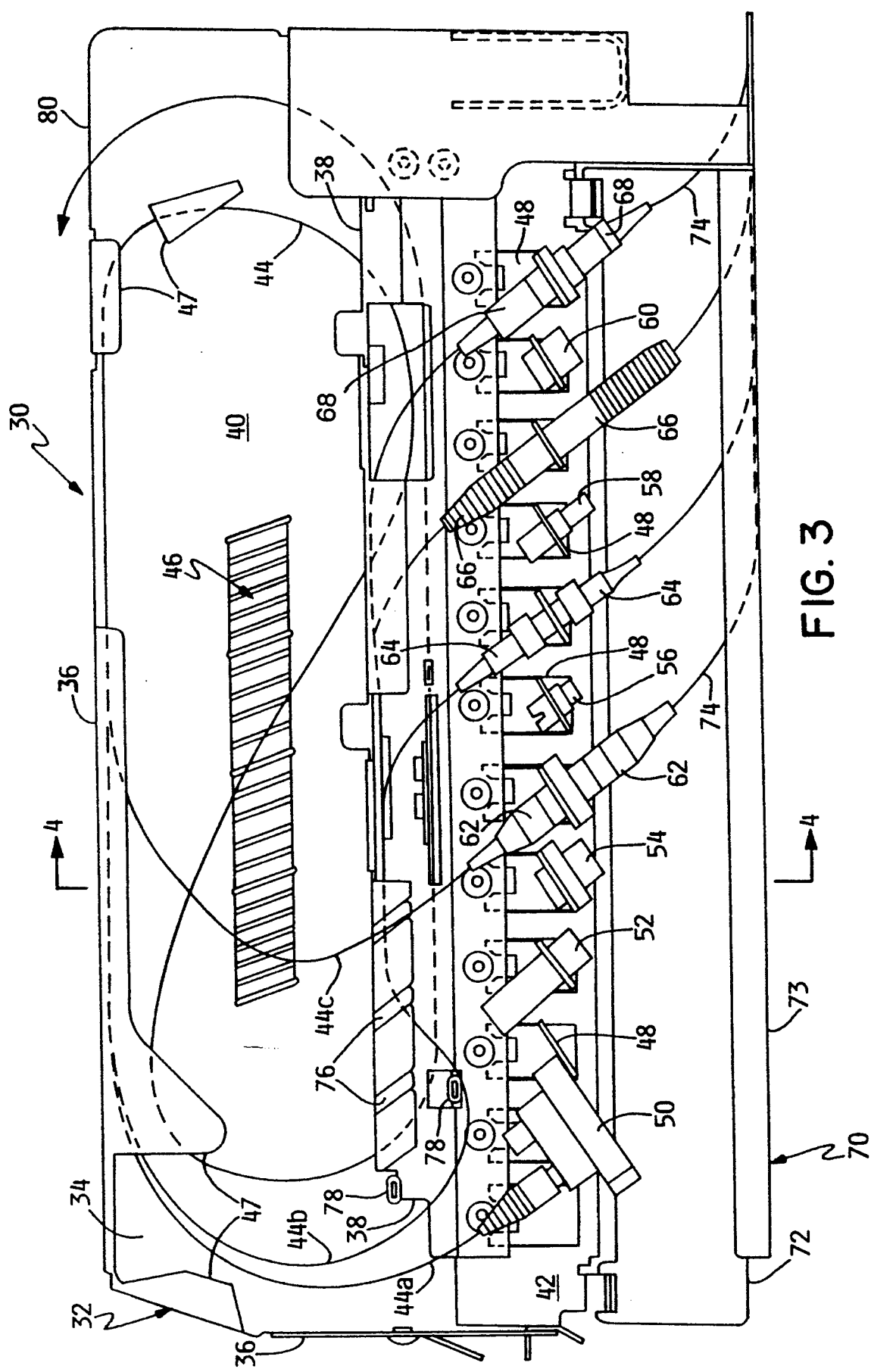
FIG. 3 is a top plan view of one embodiment of the fiber optic housing of the present invention.

With reference now to the figures, and in particular with reference to FIG. 3, there is depicted the fiber optic housing 30 of the present invention. Housing 30 is generally comprised of a support surface such as a drawer or tray 32, having a generally planar base 34 with one or more sidewalls 36. A partition or balcony 38 divides tray 32 into a rear area 40 and a front area 42 which, as discussed further below, overlap. Rear area 40 provides space for storing excess slack from a plurality of optical fibers 44, and may optionally include therein a foam block 46 or other means for retaining fiber optic splices, such as the FIBRLOK optical splices sold by Minnesota Mining and Manufacturing Company ("3M"—assignee of the present invention; FIBRLOK is a trademark of 3M). Several tabs 47 are formed from sidewalls 36 or attached to base 34 to guide and retain fibers 44 in rear area 40.

Front area 42 accommodates a bulkhead, or more preferably, a plurality of bulkhead clips 48, which respectively receive a plurality of fiber optic, or copper, connector couplings. FIG. 3 shows several such couplings, including an FDDI receptacle 50 (depicted as an ST adapter), an RJ45 (copper) receptacle 52, a biconic bay receptacle 54, an FC receptacle 56, an ST receptacle 58 and an SC receptacle 60. FIG. 3 also shows several connector plugs attached to the receptacles, including biconic connectors 62, FC connectors 64, ST connectors 66 and SC connectors 68. Housing 30 is preferably designed to be received in a larger rack or frame (see, e.g., U.S. Pat. No. 4,824,196) which may receive several such housings to form a fiber distribution unit (FDU). In this regard, housing 30 may have means, such as a spring loaded latching element 70, to releasably secure the housing to the frame. A front cover or door 72 is pivotally attached to the front of tray 32 which may be lowered when the tray is pulled out of the FDU, to allow greater access to front area 42. Door 72 has a front wall 73 which protects and guides exiting fibers 74.

Figure 4:
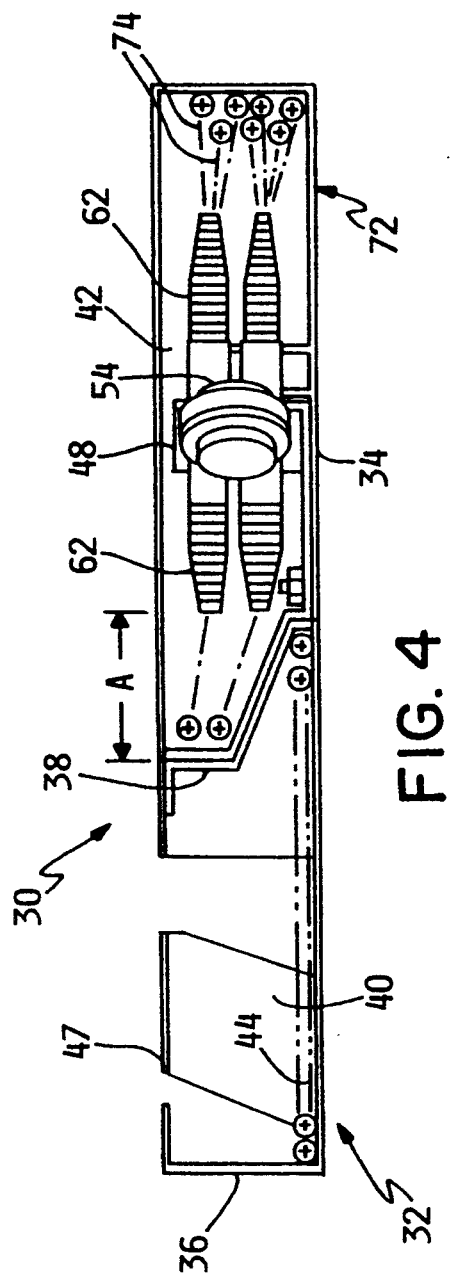
FIG. 4 is a sectional view taken along lines 4—4 of FIG. 3.

FIG. 4, which is a cross-section of housing 30 taken along lines 4—4 of FIG. 3, illustrates the overlapping nature of rear and front areas 40 and 42. In the embodiment of FIGS. 3 and 4, rear and front areas 40 and 42 share the common base 34, and balcony 38 also provides a common wall separating the areas. It can be seen that this design reduces the overall width of housing 30 by the distance A which, in the preferred embodiment, is about one inch. Conversely, if a conventional width is retained, this design allows the bulkhead to be moved the distance A toward rear area 40, thereby freeing up more space near front door 72, which in turn allows the exiting fibers 74 to bend with a larger radius. The overlap also ensures that there will still be sufficient space for the fibers 44 connected to the back side of bulkhead clips 48. As seen in FIG. 3, some of these fibers (44a, 44b) move from front area 42 to rear area 40 by passing around the side of balcony 36, while others (44c) pass through cutouts or holes 76. Means may also be provided for guiding the fibers from the front to the rear, such as posts 78 attached to balcony 38. After passing to rear area 40, fibers 44 are typically wound in an "S" shape to store excess slack, and then exit housing 30 along its back edge 80.

Figure 5:
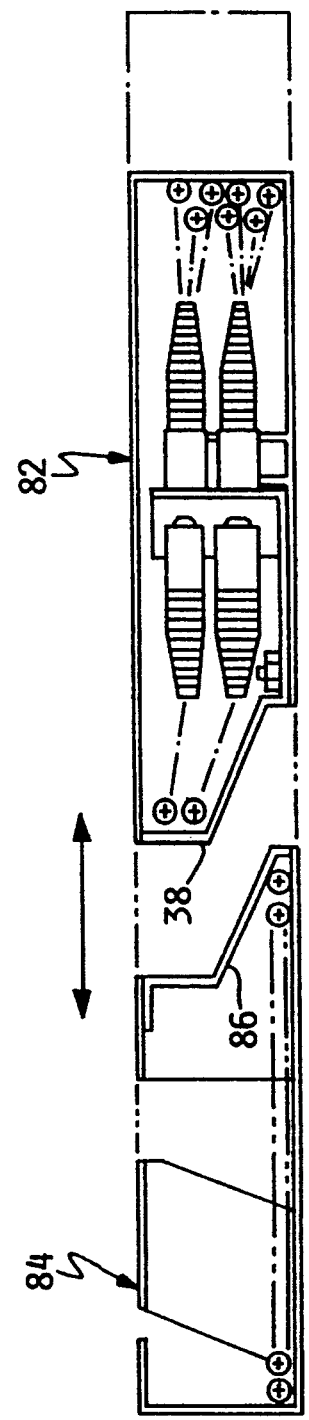
FIG. 5 is a sectional view, similar to FIG. 4, of an alternative embodiment of the fiber optic housing of the present invention wherein two separable shelves are slidably attached.
Figure 6:
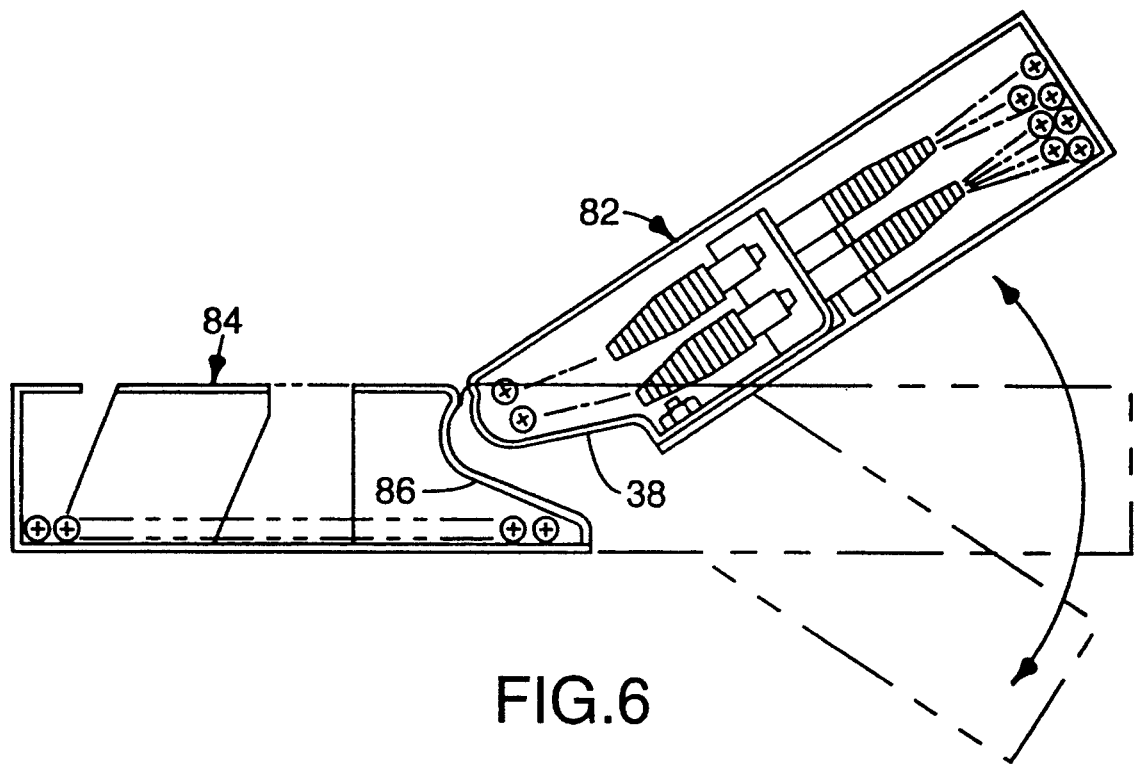
FIG. 6 is a sectional view, similar to FIG. 4, of another alternative embodiment of the fiber optic housing of the present invention wherein two separable shelves are pivotally attached.

Referring now to FIGS. 5 and 6, alternative designs are depicted for providing a partition to create the overlapping front and rear areas. In these designs, the front and rear areas are contained in front and rear shelves 82 and 84, respectively, which are removably attached to one another. At least one of these shelves must have attached thereto the overlapping partition; in the depicted embodiments, balcony 38 is attached to the back edge of front shelf 82. Rear shelf 84 may optionally have another partition 86 at its forward edge. The partition of balcony is located at the interface between the two shelves. The means for attaching front shelf 82 to rear shelf 84 may vary, or be selected to complement a particular FDU design. In the embodiment of FIG. 5, front shelf 82 slides away from rear shelf 84 like a drawer, while in FIG. 6, front shelf 82 is hingedly attached to rear shelf 84 (rear shelf 84 could be attached so as to swing either upward or downward). The modularity of these shelves also increases their usefulness. In all of the foregoing embodiments, the balcony may be formed integrally with the tray base or the shelves but, in the preferred embodiments, it is a separate piece which is attached to base 34 (or shelf by any convenient means, such as screws, and cooperates with the aperture plate discussed below. Although the exemplary embodiments show the connector area overlapping the slack storage area, the opposite construction might be employed, i.e., balcony 38 could be inclined the other direction whereby the fiber slack overlies the connector area. Alternatively, one of these areas might protrude into the other area, as in an interleave fashion, to achieve the same effect.

The present invention further contemplates the use of the novel bulkhead clips 48 to removably attach the various types of connectors to tray 32. As shown in FIGS. 7 and 8A–8C, clips 48 are inserted into slots or apertures 86 formed in a plate 88; apertures 86 could be formed in base 34, but in the present application it is deemed more economical to provide a separate plate 88, which is secured to base 34 by the lower tier 90 of balcony 38. Clips 48 have a base or foot 92, and a face plate or bulkhead riser 94 which extends generally perpendicular to foot 92. Foot 92 and bulkhead 94 may be separate pieces, but they are preferably integrally formed by stamping and bending a single piece of galvanized sheet metal (14 gauge). Foot 92 is generally planar and terminates in two tines or toes 96 which extend under lower tier 90 of balcony 38. Foot 92 is sized to fit snugly within aperture 86 but, due to the considerable tolerances in the thickness of sheet metal, coatings or other materials which are used to fabricate the clips and form the aperture plate, the clips will rattle or jam at the whim of ordinary dimensional variations. Therefore, it is advantageous to impart a slight bow to foot 92 to create a friction fit when placed within an aperture 86; however, instead of bowing the entire length of foot 92, it is sufficient to bend toes 96 slightly downward. The bottom surface of toes 96 are beveled in the stamping process to facilitate insertion under tier 90. In this manner, when clip 48 is fully inserted in aperture 86, toes 96 are forcibly urged against tier 90, and there is also an interference fit at the bend 98 in clip 48, providing excellent resistant to movement of clip 4e caused by jostling of housing 30, vibrations, etc.

Figure 7:
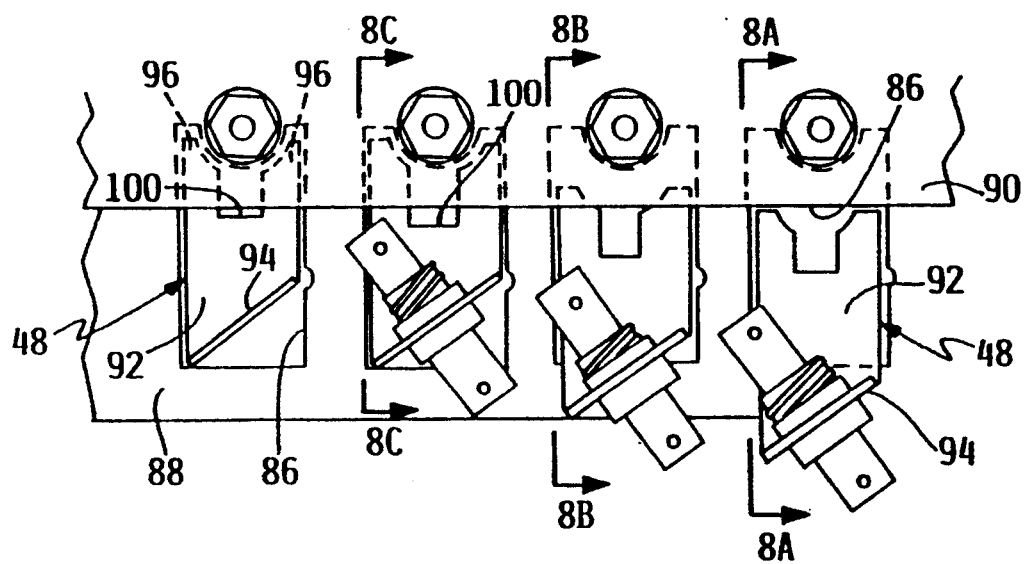
FIG. 7 is a detail plan view of the connector clips of FIG. 1.
Figure 8A:
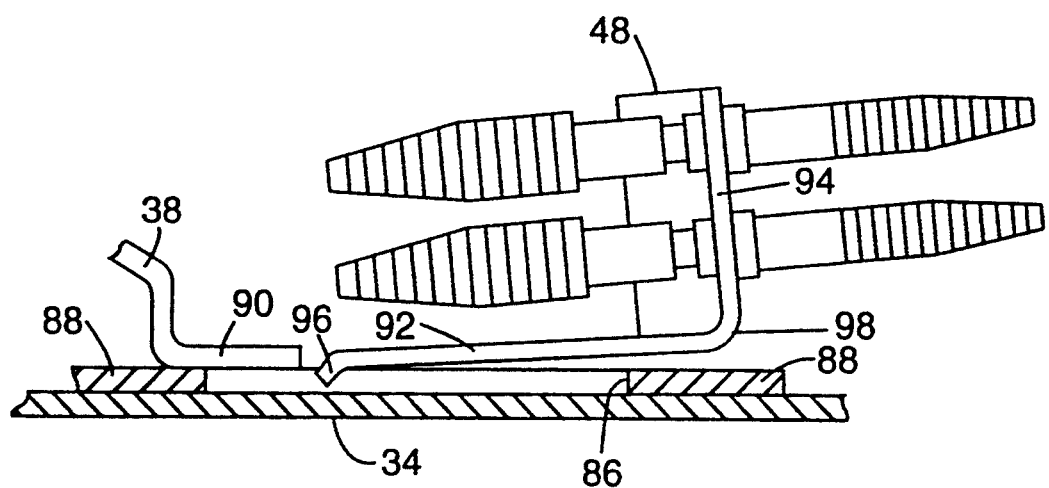
FIGS. 8A–8C are sectional views taken across lines 8A—8A, 8B—8B, and 8C—8C, respectively, of FIG. 7.
Figure 8B:
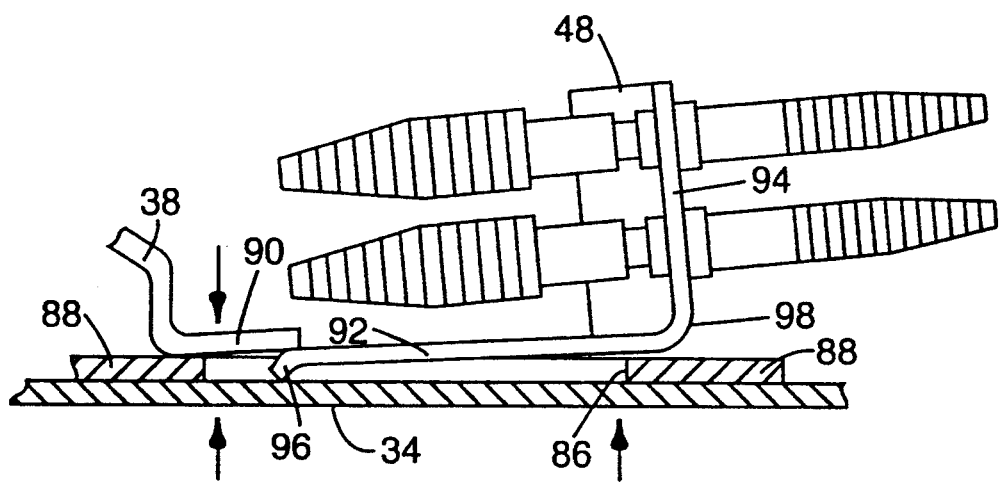
Figure 8C:
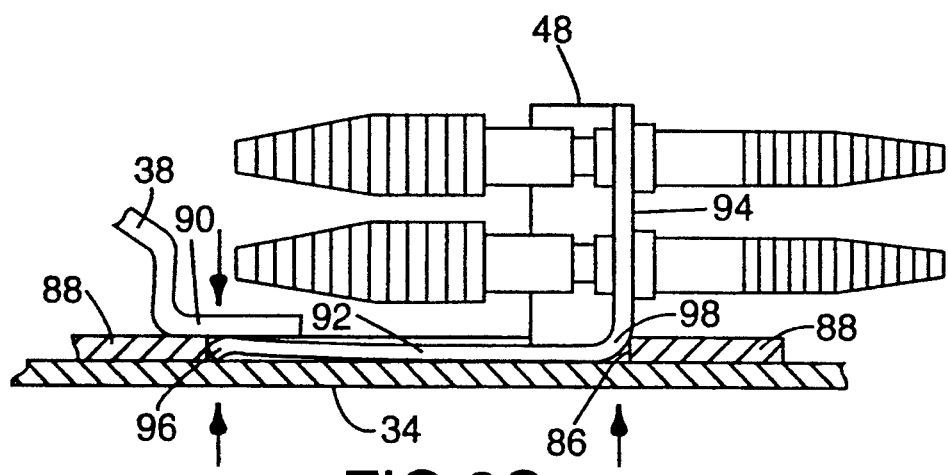
Figure 9:
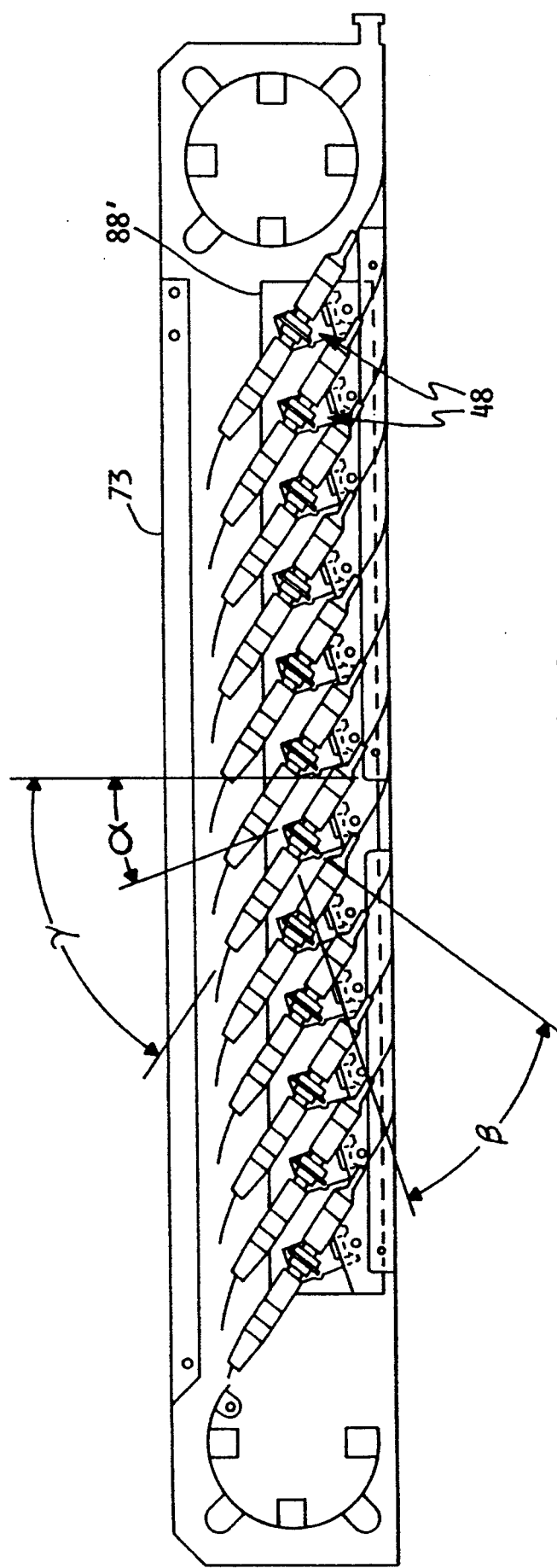
FIG. 9 is a detail plan view, similar to FIG. 7, but depicting an alternative arrangement of the connector clips of the present invention.
Figure 10:
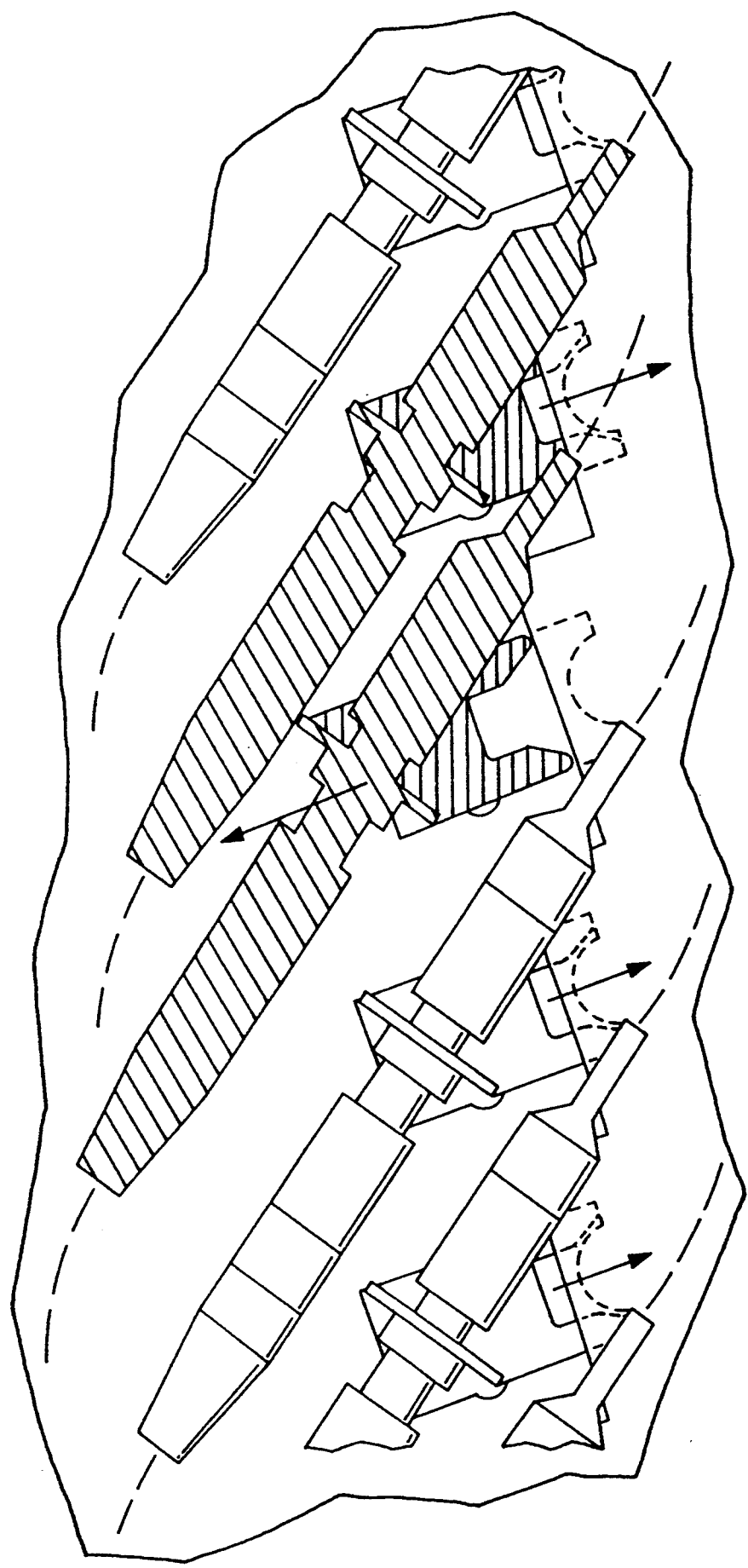
FIG. 10 is another detail plan view, similar to FIG. 7, but depicting the clearances in removing one of the connector clips while connectors are still attached to the clips.

It can also be seen in FIG. 7 that, when clip 48 is fully inserted in aperture 86, the separation between toes 96 defines a slot 100 in which a screwdriver or other implement may be inserted to forcibly remove clip 48 from aperture 86. In the preferred embodiment, slot 100 is sized so that a simple quarter-turn of the screwdriver will cam the clip out of aperture 86. Those skilled in the art will appreciate that slot 100 is accessible even if connectors have been installed on the back side of bulkhead 94. This is a result of orienting the axes of the holes or couplings in bulkhead 94 at an oblique angle with respect to the direction of insertion of the clip into the aperture (i.e., with respect to the parallel edges of foot 92), which is most easily accomplished by bending the piece of sheet metal at an angle in forming clip 48. In addition to increasing access to slot 100, this "off-axis" alignment of clips 48 also increases the bend radius of exiting fibers 74, due to the oblique orientation of the connectors with respect to wall 73 of front door 72. As shown in FIG. 9, this effect may be amplified by providing an aperture plate 88' in which the apertures are staggered in a stair-step fashion, i.e., the direction of insertion and removal of clips 48 is itself at an oblique angle with respect to wall 73. In the exemplary embodiment of FIG. 9, this angle $\alpha$ is 20°; when combined with the 35° off-axis alignment (angle $\beta$) inherent in clip 48, this results in an overall angle $\gamma$ of 55° between the fiber connector axes and the normal of wall 73. The overall angle $\gamma$ may be anywhere in the range of 5°–75° (preferably 30°–60°), and is limited only by the clearance space needed to remove the clips as illustrated in FIG. 10.

Housing 30 and its components may be constructed of any durable material, preferably a corrosion resistant sheet metal, or steel which has been dip galvanized, conversion coated, or otherwise protectively treated to yield a hard, thin and durable surface. The dimensions of housing 30 may vary considerably depending upon the application; the following approximate dimensions are considered exemplary based on the recommended 4" minimum bend radius of the fibers. Tray 32 is 6.25" wide and 16" long, with sidewalls 1.25" high, and door 72 is 2" wide, yielding an overall width of housing 30 of 8.25". Balcony 38 is 1" wide, and the rear edge of balcony 38 is located 4.75" from wall 73, providing a front area 42 having an effective width of 4.75", and a rear area 40 having an effective width of 4.3". Aperture plate 88 is 14.6"×1.8" and 0.075" thick, and apertures 86 are 1.25"×0.67"; tier 90 overhangs apertures 86 by 0.3". Foot 92 accordingly has a maximum length of 1.23", a width of 0.66", and a thickness of 0.06". The bulkhead portion 94 of clips 48 is 1.2" high and 0.8" wide; the exact width may depend upon the type of coupling to be mounted.

The examples and figures show the use of these design principles in optical fiber applications, where the constraints of fiber bending radius and larger coupling and connector dimensions place an additional design burden over what is required for copper communications conductors. These principles have primary utility in optical fibers, but can also benefit twisted pair, coaxial cable, and other conductor systems. This is particularly appropriate when there is a need to provide interchangeability between one or more copper conductor jack or connector styles and one or more fiber optic component styles. In that case, the same design principles which are described in detail here for fiber optics are applicable to the use of copper components as well. This should be particularly valuable in the intermixing, substitution, or changeover of copper and fiber lines within a housing or tray, or for the use of common inventory for either service. It will therefore be understood that the term "conductor" as used in the claims refers to either a conductor of light (optical fiber) or a conductor of electricity (wire). The use of a common layout and tooling for copper and fiber systems also brings simplicity to the instruction and skills necessary to install and maintain several types of conductor installations. It creates production and distribution economies in having a similar or identical manufacture and inventory of components, even in those cases where copper and fiber systems are neither mixed nor changed once installed and in service.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

I claim:

1. A device for housing a connector and associated conductors, comprising:
   a tray member;
   partition means for dividing said tray member into front and rear areas, said front area partially overlapping said rear area;
   means in said rear area for storing excess slack from the conductors; and
   bulkhead means in said front area for receiving the connectors, said bulkhead means including a plurality of clips releasably attached to said tray member, each of said clips having a hole therein for receiving a connector coupling.

2. The device of claim 1 wherein:
   said front and rear areas share a common, generally planar base; and
   said partition means comprises a balcony member attached to said base.

3. The device of claim 1 wherein:
   said tray member comprises a front shelf and a rear shelf adjacent said front shelf, said shelves defining an interface when attached to each other; and
   said partition means comprises a balcony member attached to one of said front or rear shelves, said balcony member being generally located at said interface when said shelves are attached to each other.

4. The device of claim 1 wherein said partition means has holes therein allowing the conductors to pass from said front area to said rear area.

5. The device of claim 1 further comprising door means hingedly attached to said tray member, proximate said front area, opposite from said rear area.

6. The device of claim 1 wherein said partition means is inclined with respect to said tray member.

7. The device of claim 3 wherein said front and rear shelves are removably attached to one another.

8. A device for housing a connector and associated conductors, comprising:
   a generally planar base member;
   a balcony member attached to said base, defining front and rear areas, said front area partially overlapping said rear area;
   means in said rear area for storing excess slack from the conductors; and
   bulkhead means in said front area for receiving the connectors, said bulkhead means including a plurality clips releasably attached to said base member, each of said clips having a hole therein for receiving a connector coupling.

9. The device of claim 8 wherein said balcony member has holes therein allowing the conductors to pass from said front area to said rear area.

10. The device of claim 8 further comprising door means hingedly attached to said base member, proximate said front area, opposite from said rear area.

11. The device of claim 8 wherein said balcony member is inclined with respect to said base member.

12. The device of claim 8 wherein:
   said base member has a plurality of apertures therein for receiving said clips; and
   said balcony member has a lower tier partially overlapping said apertures.

13. A device for housing a connector and associated conductors, comprising:
   a rear shelf having a forward edge;
   a front shelf having a back edge which is proximate said forward edge of said rear shelf, said front and rear shelves are two separate bodies and said front and rear shelves being removably attached to one another;
   a balcony member attached to said front shelf at said back edge thereof, said balcony member overlapping said rear shelf when said shelves are adjacent;
   means in said rear shelf for storing excess slack from the conductors; and
   bulkhead means in said front shelf for receiving the connectors.

14. The device of claim 13 wherein said bulkhead means includes a plurality of clips releasably attached to said tray member, each of said clips having a hole therein for receiving a connector coupling.

15. The device of claim 14 wherein:
said front shelf has a plurality of apertures therein for receiving said clips; and
said balcony member has a lower tier partially overlapping said apertures.

16. The device of claim 13 wherein said front shelf is slidably attached to said rear shelf.

17. The device of claim 13 wherein said front shelf is hingedly attached to said rear shelf.

18. A device for housing a connector and associated conductors, comprising:

a tray member having a front shelf, and a rear shelf adjacent said front shelf, said shelves defining an interface when attached to each other;

partition means for dividing said tray member into front and rear areas, said front area partially overlapping said rear area, said partition means including a balcony member attached to one of said front or rear shelves, said balcony member being generally located at said interface when said shelves are attached to each other;

means in said rear area for storing excess slack from the conductors; and bulkhead means in said front area for receiving the connectors.

* * * * *